United States Patent [19]
Flower

[11] 4,028,838
[45] June 14, 1977

[54] CLAMPER FISHHOOK

[76] Inventor: Alva E. Flower, 603 S. 14th Ave., Bozeman, Mont. 59715

[22] Filed: Dec. 2, 1975

[21] Appl. No.: 637,101

[52] U.S. Cl. .............................................. 43/43.16
[51] Int. Cl.² ......................................... A01K 83/00
[58] Field of Search .......... 43/43.16, 5, 44.8, 44.82

[56] References Cited
UNITED STATES PATENTS

| | | | |
|---|---|---|---|
| 13,649 | 10/1855 | Johnson | 43/44.82 X |
| 1,502,781 | 7/1924 | Jamison | 43/43.16 |
| 1,513,400 | 10/1924 | Koski | 43/43.16 |
| 2,597,679 | 5/1952 | Schwarzer | 43/44.8 |
| 2,841,914 | 7/1958 | Butler | 43/43.16 |

*Primary Examiner*—Louis G. Mancene
*Assistant Examiner*—Daniel J. Leach
*Attorney, Agent, or Firm*—Karl W. Flocks

[57] ABSTRACT

A barbless fishhook with a narrow throat in the hook end with the material of the hook bent back on itself to create a narrow constricted throat tight enough to hold and wedge the tissue of the fish.

9 Claims, 8 Drawing Figures

CLAMPER FISHHOOK

BACKGROUND OF THE INVENTION

The present invention refers to a fishhook and more particularly to the shape of the hook end irrespective of the shank end used with the fishhook.

Many hooks of the prior art do not possess the holding power of the fishhook of the present invention. Those that have a positive holding means are of a more complicated manufacture relative to the fishhook of the present invention or use holding means such as the commonly used barb which complicate removal and increase damage to the fish when removing the hook from the catch.

SUMMARY OF THE INVENTION

It is an object of the present invention to form a fishhook having better holding power but without the inconvenience caused by barbs on the hook.

It is a further object of the present invention to form a fishhook with good holding power but with a very simple and inexpensive structure.

The present invention basically is a fishhook having a hook end with a narrow throat for wedging and holding the tissue of the fish.

Additionally the present invention uses means to increase the contact surface or friction in the throat by use of roughened surfaces, such as for example, projections, and/or by use of flattened surface areas, either only in the throat or over the whole length of wire forming the hook.

Also, hook end point design helps in hooking the fish and, in a modified design, an additional apex point aids in placing of the bait on the hook.

BRIEF DESCRIPTION OF THE DRAWINGS

With the above objects and other objects and advantages which are inherent in the invention, reference is directed to the accompanying drawings, in which.

DESCRIPTION OF THE PREFERRED EMBODIMENTS

Figure 1A:
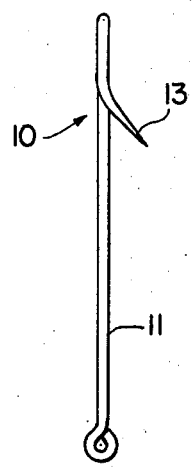
FIGS. 1A and 1B are front and side elevational views, respectively, of the design of the hook end of the fishhook of the present invention.
Figure 1B:
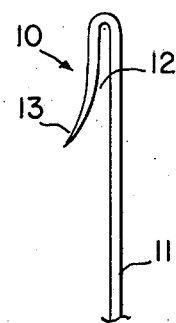

Referring first to FIGS. 1A and 1B, there is shown the basic design of the fishhook of the present invention having a hook end 10, with a shank 11 which may be of any desired design and is not part of the present invention.

Hook end 10 has a throat portion 12 and a pointed end 13. The throat portion 12 is formed possibly from a wire or some similar material, by bending the wire or similar material sharply back upon itself to form the narrowed throat portion 12. This throat portion 12 thus forms a slot into which the fish flesh becomes firmly caught by the struggle of the fish itself or by a jerk on the line by a fisherman.

Figure 2A:
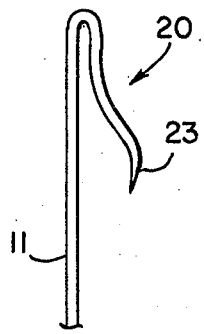
FIGS. 2A and 2B are side and front elevational views, respectively, of the hook end from FIGS. 1A and 1B with a modified pointed end.
Figure 2B:
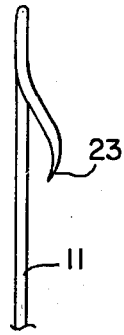

FIGS. 2A and 2B show the basic design of FIGS. 1A and 1B with a change in direction of the pointed end of the hook wherein point 23 of hook end 20 is bent down or in a direction somewhat more parallel to shank 11 than pointed end 13 with the possibility of increasing the hooking action.

Figure 3:
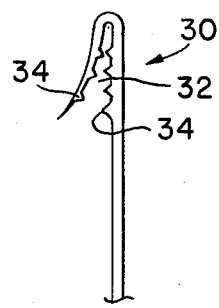
FIG. 3 is a side elevational view of a modified embodiment of the throat of the hook end of FIGS. 1A and 1B.

FIG. 3 discloses modification of hook end 10 showing hook end 30 with throat 32 and protruding or indented serrations 34 forming roughened surfaces on opposed areas of throat 32 to further increase the clasping and holding power of this throat portion on the fish flesh caught therein.

Figure 4:
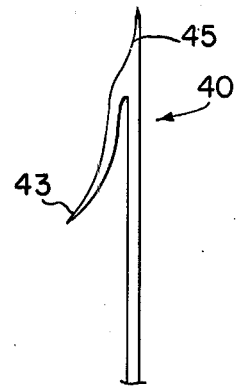
FIG. 4 is a side elevational view of a hook end of FIGS. 1A and 1B with a modified apex.

FIG. 4 discloses a further modification of the hook of the present invention which may be added or used with any of the forms of fishhook of the previous figures. In this form a point 45 is formed on the apex end of hook end 40 to allow bait to be readily draped over the bent wire or similar material of the hook as compared with a prior method of simply threading it on over the fishing point 43.

Figure 5:
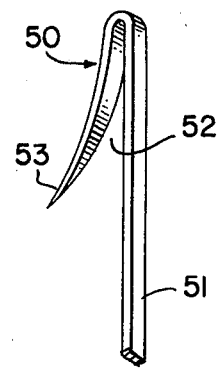
FIG. 5 is a perspective view from the rear and side of a modified body structure of the hook end of FIGS. 1A and 1B.

FIG. 5 shows an embodiment of the fishhook wherein the wire or similar material is rectangular in crosssection, made of flattened wire stock from shank 51 to point 53, and hook end 50 is bent to form narrowed throat 52. This form increases the surface contact and friction with the tissues of the hooked fish.

Figure 6:
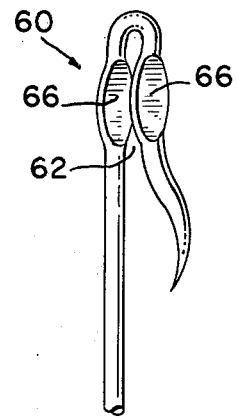
FIG. 6 is a perspective side view of another modified body structure at the throat of the hook end of FIGS. 1A and 1B.

FIG. 6 is another variation of the use of flattened portions but in hook end 60 a round wire stock is used as with the embodiments of FIGS. 1-4 but flattened portions 66 are formed only in the opposed clamping areas of throat portion 62 and thereby also have the advantages of the embodiment of FIG. 5 of increased surface contact and friction with the tissues of the hooked fish.

With the absence of a barb as in the case of other barbless hooks there is easy removal of the fish from the hook for bagging or release, but with the hook of the present invention the fish is held on the hook firmly until the fisherman chooses to remove it. Likewise, if the fishing point accidentally snags the fisherman, surgery will not ordinarily be required to dislodge it.

it will be obvious to those skilled in the art that various changes may be made without departing from the scope of the invention and the invention is not to be considered limited to what is shown in the drawings and described in the specification.

What is claimed is:

1. A fishhook having a shank end and a hook end connected thereto,
    said hook end comprising
        a wire bent back upon itself to form a narrow constricted throat or passage between the ends of said wire with a first portion of said wire extending from a pointed end to a connecting bent portion and a second portion of said wire extending from said connecting bent portion to said shank end with an intermediate portion of each said first and second portions of said wire forming said narrow constricted throat or passage,
        roughened areas on opposing faces of said intermediate portions of said wire at least in said narrow constricted throat or passage whereby the tissue of a fish can be wedged and held in said narrow constricted throat or passage when a fish is caught on the fishhook.

2. The fishhook of claim 1, further characterized by said roughened areas being formed by projections on said opposing faces.

3. A fishhook having a shank end and a hook end connected thereto, said hook end comprising a wire bent back upon itself to form a narrow constricted throat or passage between the ends of said wire with a first portion of said wire extending from a pointed end to a connecting bent portion and a second portion of said wire extending from said connecting bent portion to said shank end with an intermediate portion of each said first and second portions of said wire forming said narrow constricted throat or passage, and a point on the apex of said connecting bent portion whereby the tissue of a fish can be wedged and held in said narrow constricted throat or passage when a fish is caught on the fishhook.

4. A fishhook having a shank end and a hook end connected thereto, said hook end comprising a wire bent back upon itself to form a narrow constricted throat or passage between the ends of said wire with a first portion of said wire extending from a pointed end to a connecting bent portion and a second portion of said wire extending from said connecting bent portion to said shank end with an intermediate portion of each said first and second portions of said wire forming said narrow constricted throat or passage, and means to wedge and hold the tissue of a fish in said narrow constricted throat or passage when a fish is caught on the fishhook.

5. The fishhook of claim 4, further characterized by flattened areas on at least the opposing faces of said intermediate portions of said wire in said narrow constricted throat or passage.

6. The fishhook of claim 5, further characterized by said wire being of flattened stock having at least one flat surface.

7. The fishhook of claim 6, further characterized by said flattened stock having a substantially rectangular cross section.

8. A fishhook having a shank end and a hook end connected thereto, said hook end comprising a wire bent back upon itself to form a narrow constricted throat or passage between the ends of said wire with a first portion of said wire extending from a pointed end to a connecting bent portion and a second portion of said wire extending from said connecting bent portion to said shank end with an intermediate portion of each said first and second portions of said wire forming said narrow constricted throat or passage, said pointed end extending away from said connecting bent portion in a direction at an angle to a plane passing through said intermediate portions of said first and second portions, whereby the tissue of a fish can be wedged and held in said narrow constricted throat or passage when a fish is caught on the fishhook.

9. The fishhook of claim 8, further characterized by said pointed end extending away from said connecting bent portion with a first portion of said pointed end connected to said intermediate portion of said first portion of said wire and at an angle to said intermediate portion and a second end portion of said pointed end connected to said first portion of said pointed end at an angle thereto, with said second end portion of said pointed end extending in a direction substantially parallel to said shank end.

* * * * *